March 9, 1926.　　　　　　　　　　　　　　　　　　　　1,575,924
T. G. McGIRR
MACHINE FOR BANDING CIGARS
Filed March 28, 1925　　　8 Sheets-Sheet 2

Fig. 2.

INVENTOR
Theodore G. McGirr
BY
Rabro Kal
ATTORNEYS.

March 9, 1926. 1,575,924
T. G. McGIRR
MACHINE FOR BANDING CIGARS
Filed March 28, 1925 8 Sheets-Sheet 3

INVENTOR:
Theodore G. McGirr,
BY
ATTORNEYS.

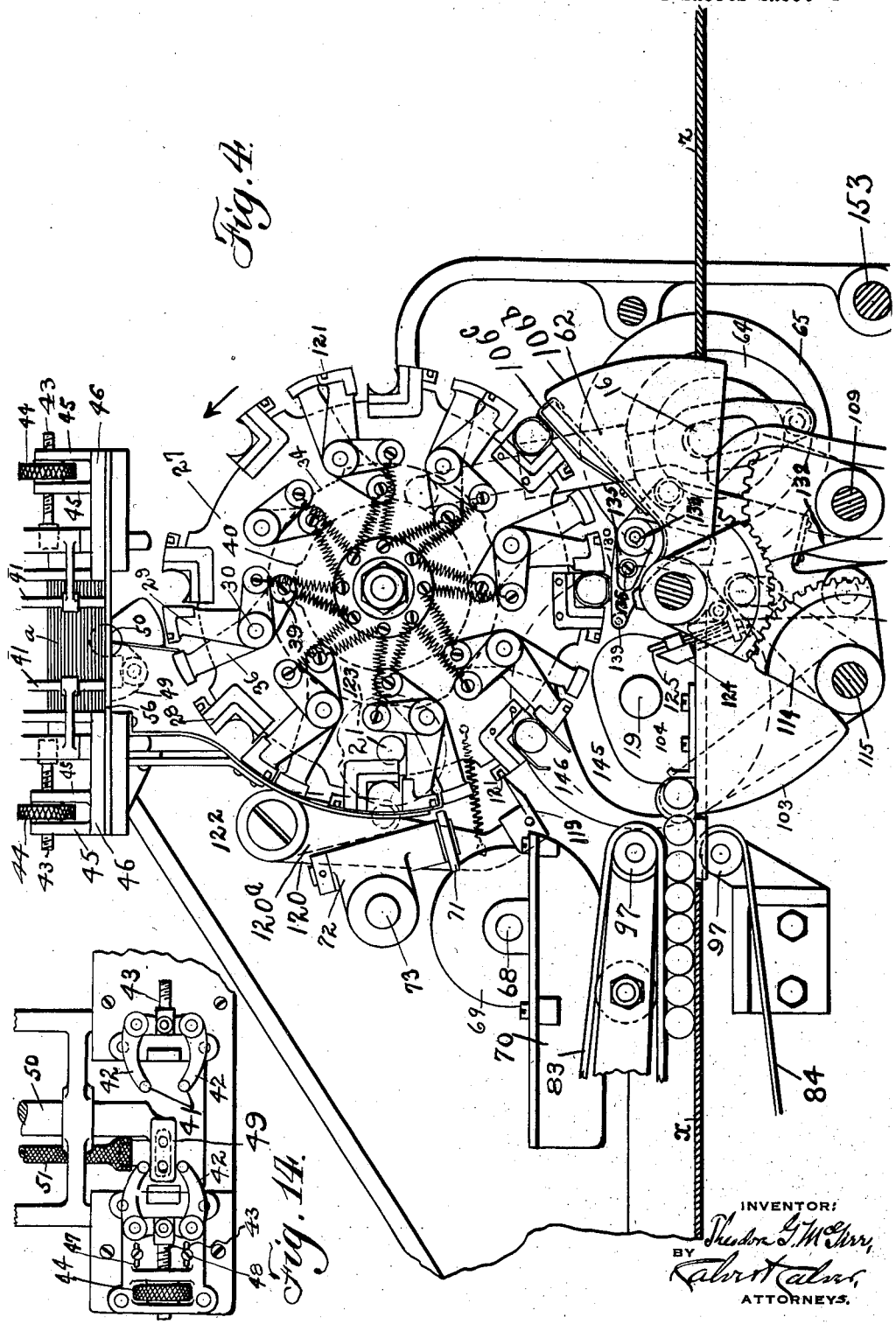

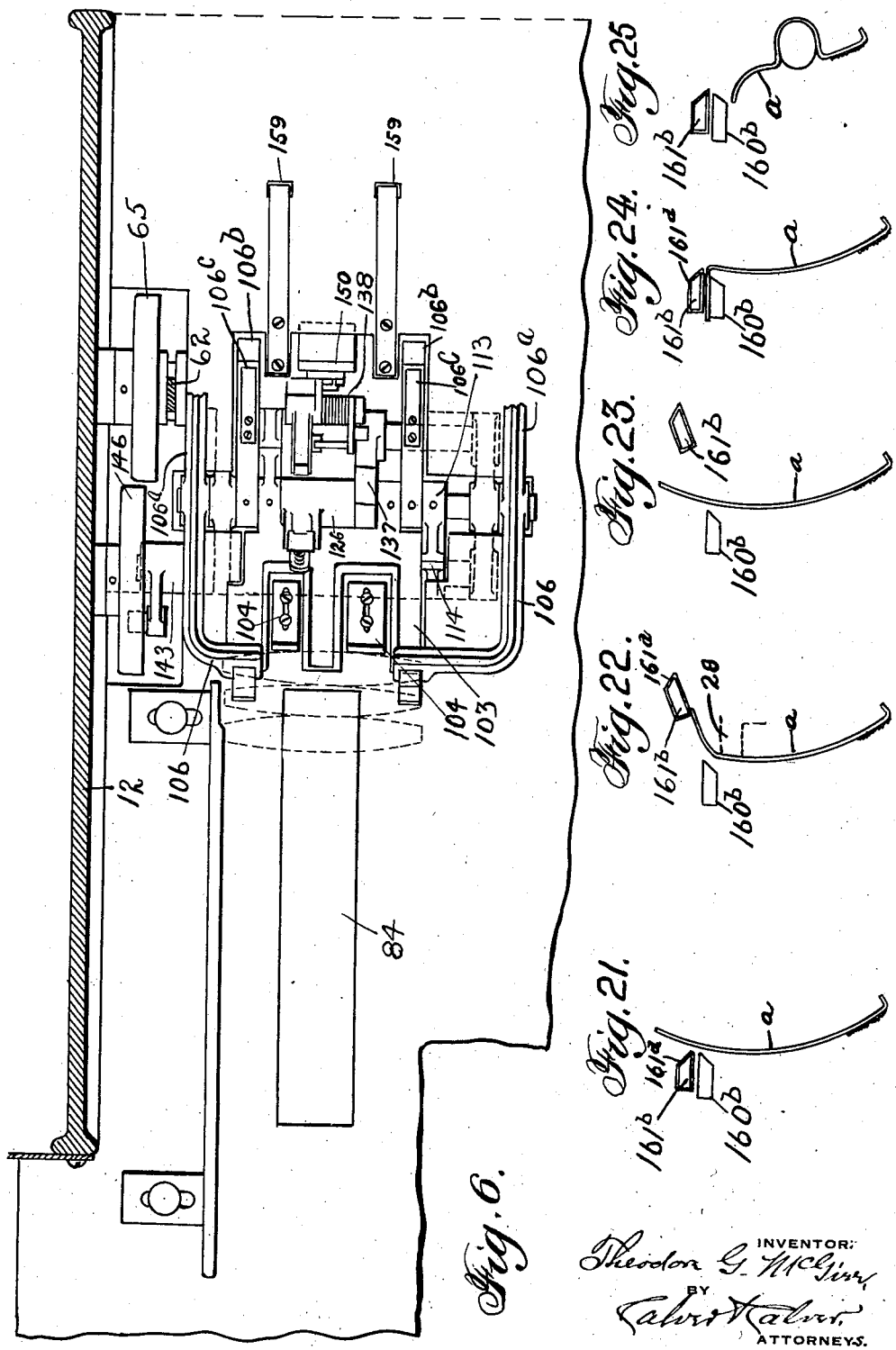

March 9, 1926.
T. G. McGIRR
1,575,924
MACHINE FOR BANDING CIGARS
Filed March 28, 1925
8 Sheets-Sheet 6
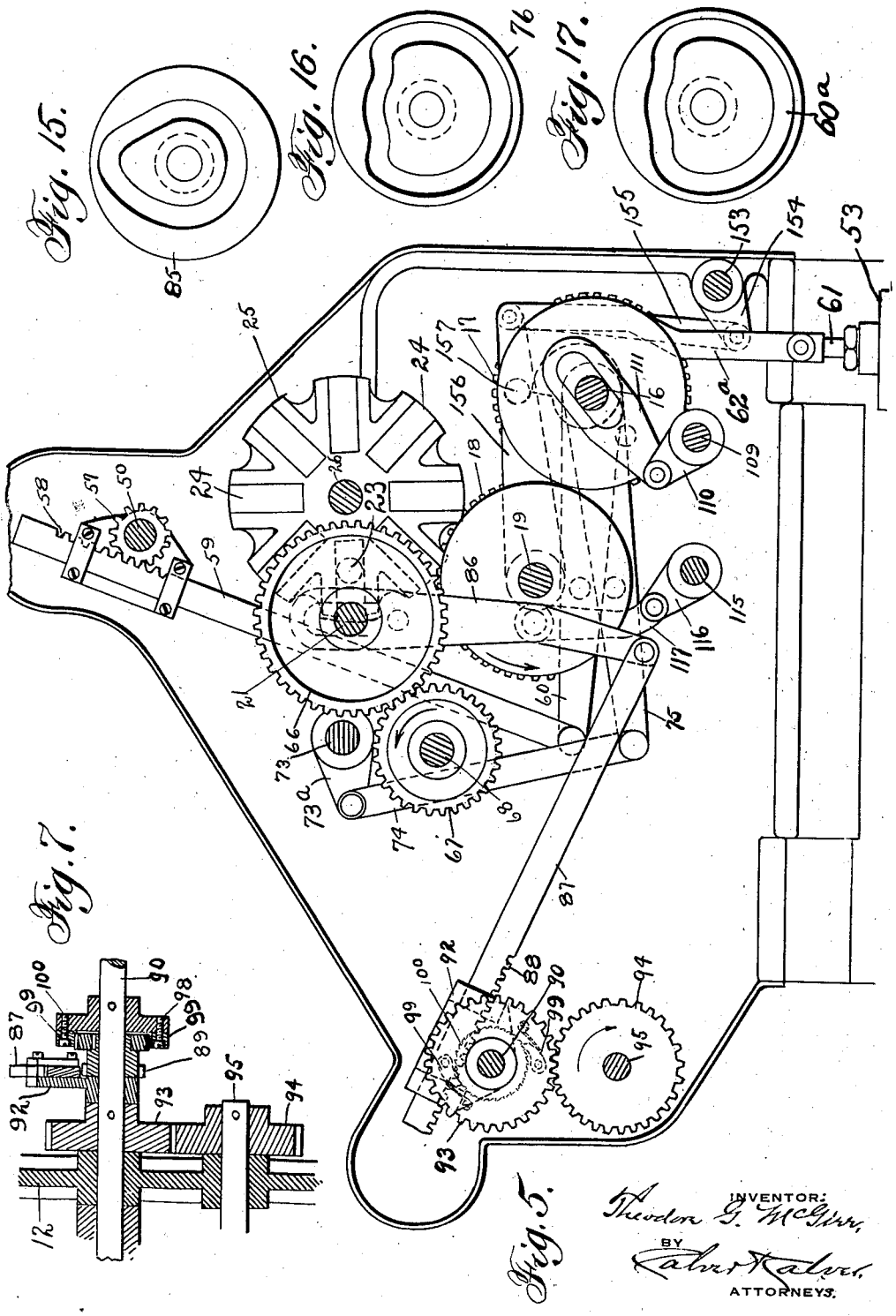

March 9, 1926.
T. G. McGIRR
1,575,924
MACHINE FOR BANDING CIGARS
Filed March 28, 1925
8 Sheets-Sheet 7
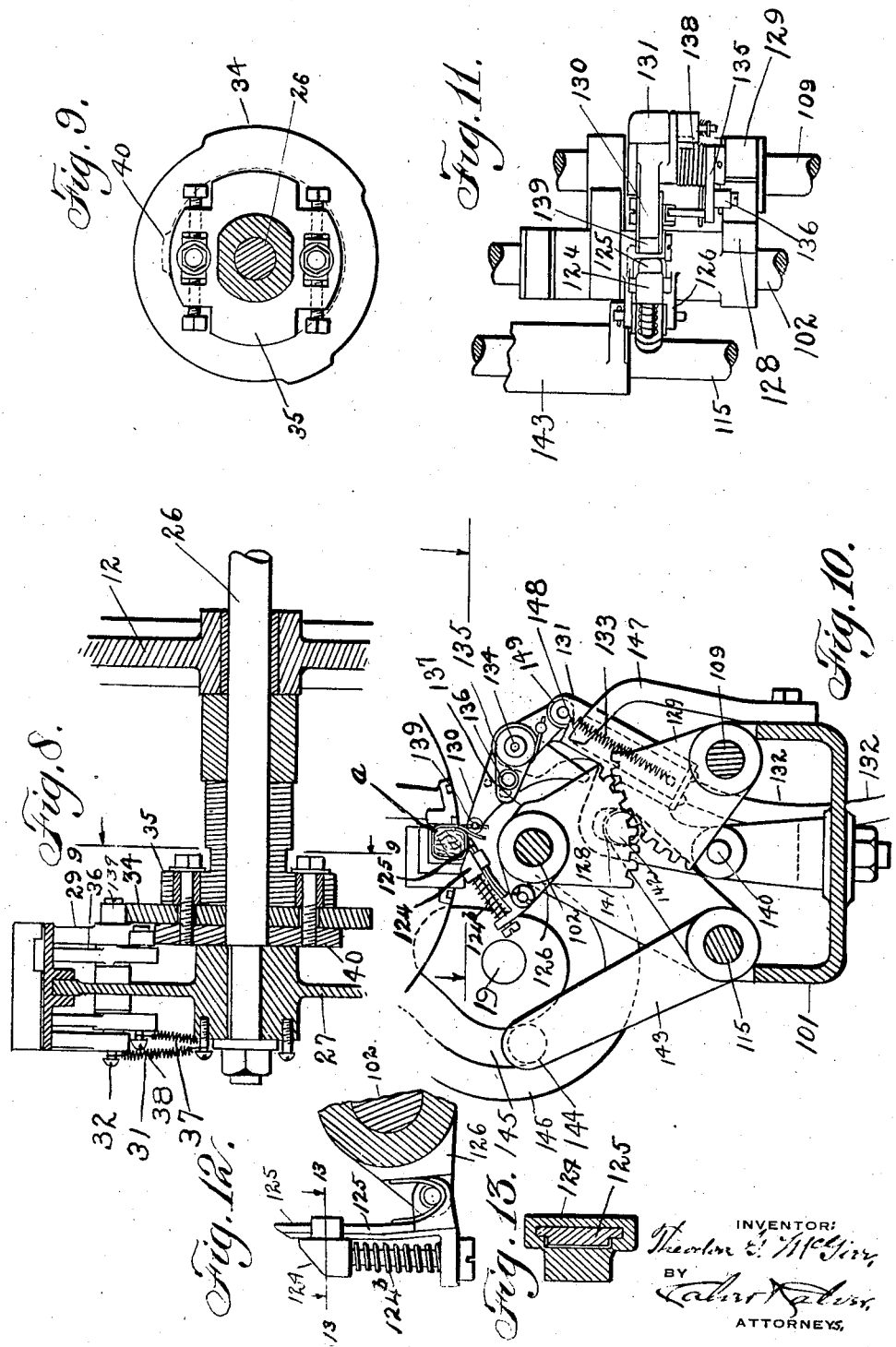

March 9, 1926. 1,575,924
T. G. McGIRR
MACHINE FOR BANDING CIGARS
Filed March 28, 1925 8 Sheets-Sheet 8

Theodore G. McGirr
Inventor,
by Robert Katz
Attorneys.

Patented Mar. 9, 1926.

1,575,924

UNITED STATES PATENT OFFICE.

THEODORE G. McGIRR, OF BROOKLYN, NEW YORK.

MACHINE FOR BANDING CIGARS.

Application filed March 28, 1925. Serial No. 18,970.

*To all whom it may concern:*

Be it known that I, THEODORE G. MCGIRR, a citizen of the United States, residing at Brooklyn, in the county of Kings and State of New York, have invented certain new and useful Improvements in Machines for Banding Cigars, of which the following is a specification.

This invention relates to certain improvements on the cigar banding machine covered by my U. S. Patent No. 1,491,871, the invention having for its object to simplify the construction and improve the efficiency of the machine of my said patent, all as will hereinafter more fully appear.

Figure 1:
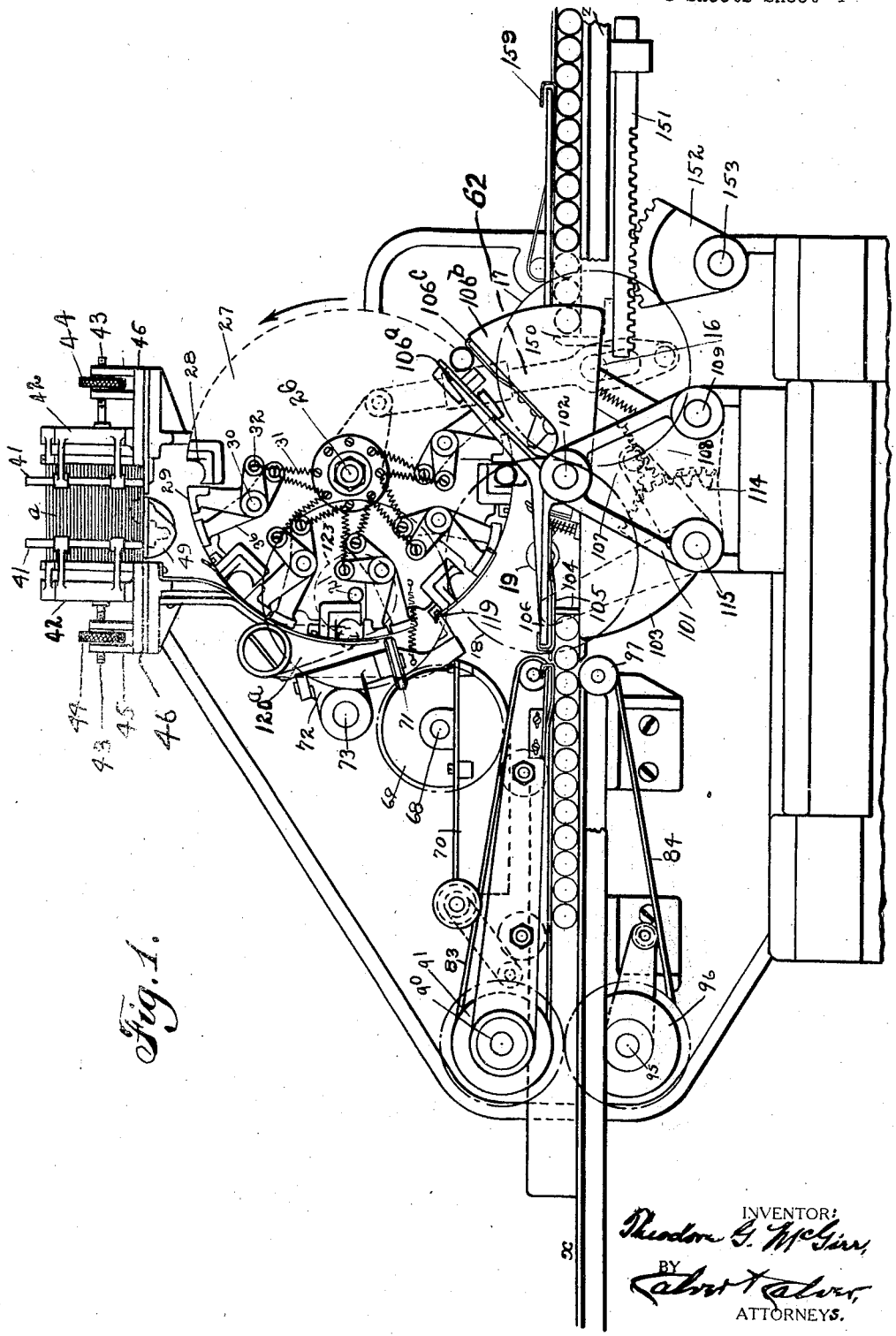
Figure 3:
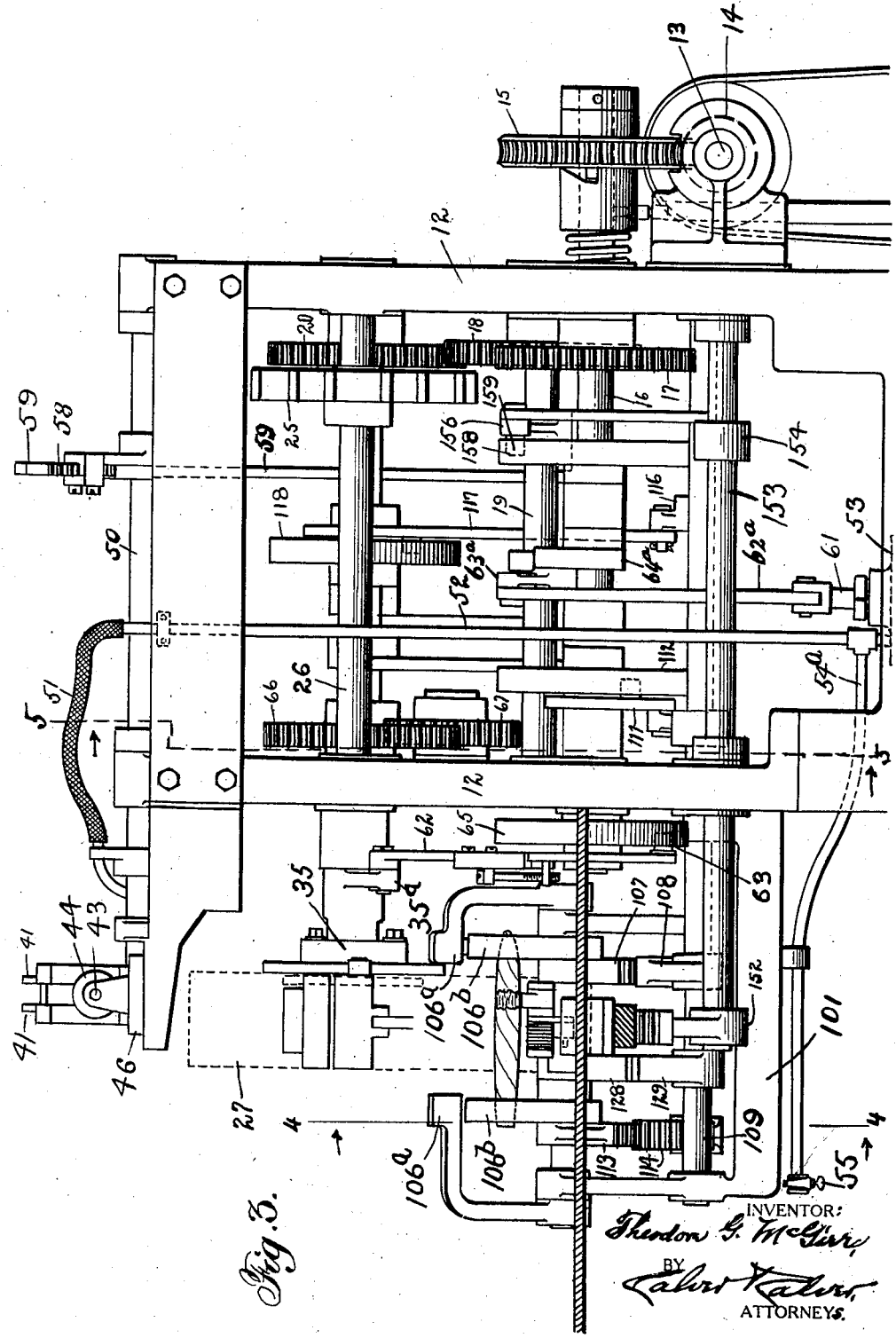
Figure 18:
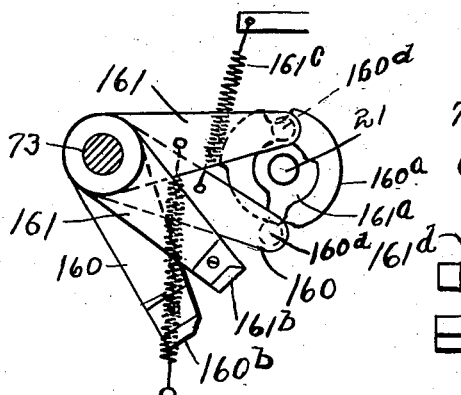
Figure 19:
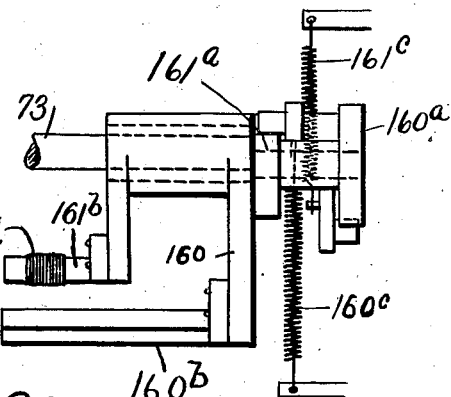
Figure 20:
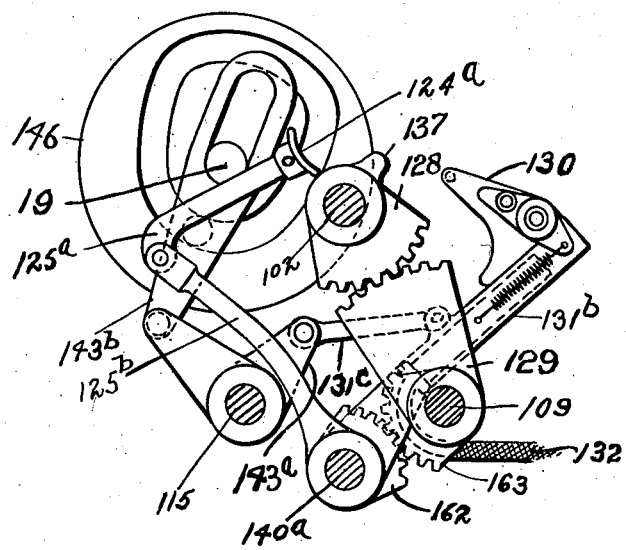

In the accompanying drawings Fig. 1 is a side elevation of a cigar banding machine embodying the present invention. Fig. 2 is a plan view and Fig. 3 is an end view of the same. Fig. 4 is a view similar to Fig. 1 on a somewhat larger scale, with certain parts in section on line 4—4, Fig. 3. Fig. 5 is a vertical section on line 5—5, Figs. 2 and 3. Fig. 6 is a detail plan view of the band folding mechanism and co-operating parts. Fig. 7 is a detail sectional view illustrating a part of the operating mechanism for the feeding belts. Fig. 8 is a fragmentary sectional view of the carrier wheel, the jaw-operating mechanism, and some co-operating parts. Fig. 9 is a detail view of the jaw-operating cams. Fig. 10 is a fragmentary sectional elevation showing part of the band folding and sealing mechanism, and Fig. 11 is a plan view of the parts shown in Fig. 10. Fig. 12 is a detail view of the back band folder. Fig. 13 is a detail sectional view on line 13—13, Fig. 12. Fig. 14 is a detail plan view of the band magazine and adjacent parts. Figs. 15, 16 and 17 are detail views of cams to be referred to. Figs. 18 and 19 are detail views of the band bending or curling mechanism. Fig. 20 is a detail view of the sealing device and back folder and their operating parts. Figs. 21 to 25, inclusive, are detail views showing the operation of the bending or curling device.

Referring to the drawings, 12 denotes the frame of the machine and 13 is a power shaft connected with any suitable source of power, said shaft being mounted in suitable brackets supported by the frame 12. The shaft 13 carries a worm 14 meshing with a worm wheel 15 having a suitable clutch connection with the main driving shaft 16 of the machine. The shaft 16 carries a gear wheel 17 which meshes with a gear wheel 18 on a cam shaft 19, the said gear wheel 18 meshing with a gear wheel 20 on a shaft 21 provided with an arm 22 which carries a pin or roller 23 adapted to enter slots 24 of a wheel 25 mounted on a shaft 26 to impart an intermittent rotary movement to said shaft, this operating means for the shaft 26 being the well-known "Geneva" mechanical movement.

Fixed to the shaft 26 outside of the frame of the machine is a carrier wheel 27 having a circular series of holders which receive the cigars and maintain them in proper positions while the bands are being applied thereto. To this end each cigar holder comprises a fixed rectangular jaw 28 with which co-operates a movable jaw afforded by the outer end of a bell-crank lever 29 fulcrumed on a pin 30 on the wheel 27, the inner end of the said bell-crank lever being connected by a coil spring 31 with a pin 32, said spring serving to urge the outer end of the said bell-crank lever, affording the movable jaw, yieldingly towards the said fixed jaw 28 of the cigar holder. The inner member of each bell-crank lever 29 carries a roller resting against the periphery of a cam disk 34 fixed to a hub 35 loosely mounted on the shaft 26.

Pivotally mounted on the pin 30 is a lever 36 the outer end of which, in co-operation with the outer part of the bell-crank lever 29, affords a nipper for engaging and holding the ends of cigar bands, as will presently appear. The outer end of the nipper lever 36 is yieldingly pressed towards the outer end of said bell-crank lever by a coil spring 37 connecting the inner arm of said nipper lever with a pin 38 on the wheel 27, so as normally to press the outer end of said nipper lever towards the outer end of the bell-crank lever 29.

Each lever 36 carries a roller 39 resting against the periphery of a cam disk 40 preferably adjustably secured to the cam disk 34. The levers 29 and 36 are operated at proper times to open and close the cigar holders afforded by the fixed and movable jaws 28 and 29, as also to open and close the nippers afforded by the jaws 29 and the outer ends of the levers 36, by rocking movements imparted to the hub 35. To this end the hub 35 is provided with an arm 35ª to which is jointed a yoke 62 carrying a cam pin or roll 63 entering a cam groove 64 in a cam wheel 65 fixed to the driving shaft 16.

The parts thus far described are or may be essentially the same as all the corresponding parts of my said patent, excepting as to the relative adjustability of the cam disks 34 and 40.

Mounted above the carrier wheel 27 is a band magazine the holding parts of which are preferably made adjustable both as to length and breadth for the purpose of accommodating different sizes and forms of cigar bands. The bands a are held in position laterally by pins 41 carried at the outer ends of bell-crank levers 42 the inner arms of which are connected with rods 43 having screw threaded portions on which are mounted knurled nuts 44 mounted between posts 45 fixed to the base plates 46 of the magazine, so that by turning said nuts the distance between the pins 41 may be varied to accommodate different widths of bands. Also by adjusting the plates 46 toward and from each other the length of the magazine may be varied to accommodate bands of different lengths. This adjustment of the plates 46 may be provided for in any suitable manner, as by slots 47 in said plates, and set screws 48 passing through said slots.

The bands are fed to the band nippers in a manner similar to that performed in the machine of my said patent, by virtue of a vibrating suction arm 49 carried by a shaft 50. To the said suction arm 49 extends a flexible hose 51, said hose being connected with a pipe 52, which, in turn, is connected to the cylinder 53 of an air pump. From the pipe 52 extends a pipe 54ª extending out to the side of the machine and which is provided with a pet cock 55 which may be opened when it is desired to break the suction connection to the vibrating band-feeding suction-arm when it is necessary to run the machine without feeding in the bands, as is desirable in banding the last three cigars of a box.

The band magazine has a partly open bottom and the bands rest slightly at one end on a lip 56 from which they are successively disengaged by the vibrating suction arm.

The rock shaft 50 is provided with a pinion 57 engaged by a rack 58 on a bar 59 connected with a lever 60 fulcrumed on the driving shaft 16 and operated by a cam 60ª carried by the shaft 19. The rod 61, which carries a piston working in the air pump cylinder 53, is connected by a link 62ª with the outer end of a lever 63ª fulcrumed on the cam shaft 19 and operated by a cam 64ª on the driving shaft 16.

The bands which are to be fed from the magazine will, in practice, preferably be gummed at one end and it will therefore be necessary to moisten the gummed ends of the bands in applying them to the cigars. To this end the shaft 21 is provided with a gear wheel 66 meshing with a pinion 67 fixed to a short shaft 68 carrying a disk 69 dipping into a water tank 70. Normally running in contact with the disk 69 is a moistening wheel 71 carried by an arm 72 mounted on an oscillating shaft 73 having an arm 73ª connected by a link 74 with a lever 75 fulcrumed on the driving shaft 16 and operated by a cam 76 on the cam shaft 19. Thus when the machine is in operation the moistening wheel 71 will be swung inward at the proper times to moisten the gummed ends of the bands as they successively pass by the said wheel.

It is obvious that the mechanism just described might be utilized for applying an adhesive to ungummed bands, if desired, by filling the tank 70 with a liquid adhesive instead of water.

The cigars to be banded are placed on a table $x$ from which they may be manually fed forward so as to come between the two coincidently moving feeding belts 83 and 84. The mechanism for operating said belts comprises a cam 85 fixed to the shaft 19 and operating a lever 86 fulcrumed on the shaft 21 and jointed to a bar 87 having a toothed or rack portion 88 engaging a pinion 89 fixed to a shaft 90 having a pulley 91 over which the feeding belt 83 runs. The rack 88 is held in mesh with the pinion 89 by a floating bearing 92 pivotally mounted on the shaft 90. Fixed to the shaft 90 is a gear wheel 93 meshing with a similar gear wheel 94 carried by a shaft 95 on which is mounted a pulley 96 around which the feeding belt 84 passes so that the said belts 83 and 84, which run loosely over pulleys 97, will be caused to be moved co-incidentally. Fixed to the shaft 90 is a disk 98 on which are pivotally mounted two pawls 99 held in spring-pressed engagement with a ratchet wheel 100 which is rigidly connected with the pinion 89 loosely mounted on the shaft 90, so that as the said rack bar is reciprocated a forward feeding motion will be imparted to the shaft 90 when moving in one direction, but said rack bar will have an idle movement when moving in the opposite direction, as will be understood from the foregoing.

One essential difference between the present machine and the machine of my Patent No. 1,419,871, hereinbefore referred to is in the mechanism for carrying the cigars discharged from the feeding belts 83 and 84 to the intermittingly rotating cigar carrying wheel 27 to be banded and for removing them from the said wheel after the banding and sealing operations and which mechanism will now be described.

Mounted in suitable bearings, which include the frame of the machine, and a bracket 101, is a shaft 102. Loosely mounted on the shaft 102 are feed arms 103 connected together to move coincidently and onto which a cigar coming from the feeding belts 83 and 84 is fed, the forward movement of the cigar being limited by stops 104. A cigar thus resting on said feed arms is yieldingly held in place by springs 105 carried by auxiliary feed arms 106 which are connected with the said shaft 102 to move therewith. Connected with the said feed arms 103, to operate the same, is a gear segment 107 loosely mounted on the shaft 102, and meshing with said segment 107 is a gear segment 108 fixed to the shaft 109. Attached to the shaft 109 is an arm 110 jointed to a yoke 111 mounted for sliding movement on the driving shaft 16 and operated by a cam 112 fixed to the said shaft 16. Thus by means of the connections just described rocking movements at proper intervals will be imparted to the feeding arms 103 to lift the cigars up into the cigar holders in the carrier wheel 27.

Fixed to the shaft 102 is a segment gear 113 with which meshes a segment gear 114 fixed to a shaft 115 having an arm 116 connected to the lower end of a yoke 117 the upper end of which is slotted to receive the shaft 21, said yoke being operated by a cam 118 fixed to said shaft 21. In the operation of the machine the arms 103 and 106 move upward together to place the cigar in a holder of the carrier wheel 27 and when a cigar is thus placed in its holder the feed arms 103 will move downward, leaving the auxiliary feed arms 106 in their elevated positions momentarily.

The auxiliary feed arms 106 have rearward extensions 106ª which serve as discharge arms to remove the banded cigars from the carrier wheel 27, and moving with said arms 106ª are arms 106ᵇ preferably provided with light springs 106ᶜ, the said arms 106ª and 106ᵇ being arranged to embrace a cigar, as shown in Fig. 1, which has been released from its holder in the carrier wheel and which is to be lowered in position to be discharged onto the receiving table z.

The bands fed from the band magazine hereinbefore described are held in the nippers of the carrier wheel 27 the same as in the machine of my said Patent No. 1,491,896 and lie across the cigar holders so that when a cigar is inserted in a holder by the feeding arms just described the band will be partly wrapped around such cigar as the latter is inserted in the holder. To maintain the band under certain tension and for scoring or bending the band near its end, as shown in Fig. 4, a pointed scorer 119 carried by a vibrating arm 120 of a bell-crank lever is provided. Said pointed scorer co-operates with a lug 121 on a cigar holder, and is fulcrumed on a stud 122, the inwardly extending arm 120ª of said bell-crank lever, being arranged to be operated by a cam 123 on the shaft 21, so that the scorer will be actuated at proper intervals to effect the bending of the cigar bands near their ends to facilitate the folding operation.

A cigar which has been placed in a holder with a band partially wrapped around it, as shown in the lower left part of the carrier wheel 27 in Fig. 4, is carried at the next forward movement of the said wheel to the position shown in Fig. 10. When a cigar has reached the position last referred to a front folder, comprising a yieldingly mounted shoe 124 pressed against by a coil spring 124ᵇ, and a spring tucking portion 125, will engage the band and fold it about the cigar as shown in Fig. 10. This folder is carried by an arm 126 fixed to the rock shaft 102 to which is secured a segment gear 128 meshing with a similar segment gear 129 fixed to the shaft 109, so that said folder will be operated, at proper intervals, to fold a band around a cigar and tuck in the bent ungummed end thereof, as shown in Fig. 10. This operation is performed, to fold the band around a cigar, at the same time that a cigar is being lifted by the feed arms 103 to place a cigar in a cigar holder of the carrier wheel 27 next behind the holder which holds the cigar around which a band is being folded.

When a band has been folded around the cigar as shown in Fig. 10 the folder just referred to retreats, and a yieldingly-mounted heated sealing member 130 advances from the position shown in Fig. 10 to the position shown in Fig. 4, thus drying and ironing down the last end of the band and completing the sealing operation. The member 130 is pivotally mounted, by virtue of a stud 134, on a vibrating block 131 which is electrically heated through a cable 132. The operating end of the sealing member and back folder 130 is yieldingly pressed upward by a coil spring 133 attached to the rear end of said member 130 and to the said block 131.

Also mounted on a pivot stud 134 is an arm 135 carrying a roller 136 which is arranged to be engaged by a cam surface 137 formed on the sector gear 128. The arm 135 is yieldingly connected with the sealing member 130 by a stiff torsional spring 138 so that when the said roller 136 is engaged by said cam surface 137, which is after the said sealing member comes to rest in the position showing Fig. 4, the said member is yieldingly pressed upward against the last end of the cigar band being sealed, thus ensuring a proper sealing of the said band. The initial yielding pressure of the back folder or sealing member 130 is preferably conveyed to the band being sealed through a roller 139 mounted on the forward end of the said back folder and sealing member 130.

The vibrating heater block 131 is pivotally mounted on a stud 140 and is provided with a slot 141 entered by a pin or roller stud 142 carried by one arm of a bell-crank lever 143 fulcrumed on the shaft 115, the other arm of said lever being provided with a roller stud 144 entering a cam groove 145 of a cam disk 146 mounted on the shaft 19. Prior to the time when the back folder or sealing member is brought into engagement with the last end of the band to be sealed, as shown in Fig. 10, its inner end is lifted somewhat higher than shown in Fig. 10, the lifting movements of said inner end through the influence of the spring 133, being limited by a stop arm 147 mounted on a fixed part of the frame of the machine and provided at its upper end with a cam lug 148 engaged by a roller 149 at the outer end of the pivoted back folder or sealing member 130. Thus the roller 139 will be lifted high enough so that it cannot possibly miss the depending free end of the band to be sealed and will be brought into proper position, as shown in Fig. 10, so that a continued forward movement of the back folder and sealing member 130 will properly iron down and seal the band as hereinbefore stated.

In the operation of the machine a cigar is inserted in a holder of the carrier wheel 27 by the feeding arms 103 hereinbefore referred to, at the point at the lower left part of said carrier wheel, as shown in Fig. 4, and this may be termed the first banding station. At the next forward rotating movement of said carrier wheel in the direction of the arrow shown in Fig. 4 the cigar with the band partly folded about it moves from the first banding station to what may be termed the second banding station when a cigar is brought to the lower side of the carrier wheel, as shown in Figs 4 and 10. At the next forward movement of the carrier wheel a cigar is brought to what may be termed the third or discharge station and when it arrives at this point the holder in which the banded cigar has been maintained is opened, thus freeing the cigar and permitting it to rest on the light spring 106$^c$ mounted on an arm 106$^b$ which moves with the feeding arms 106 hereinbefore described. Thus when the said feeding arms are being lifted to carry the next cigar upward into a holder in the carrier wheel the arms 106$^b$ will be lowered to bring the cigar resting on the springs 106$^c$ to the level of the discharge table $z$ and in front of an ejector 150 carried on a rack bar 151 operated by a segment gear 152 mounted on a shaft 153 provided with an arm 154 to which is jointed a link 155 connected to a lever 156 fulcrumed on the shaft 19 and provided with a roller stud 157 entering a cam groove in the cam wheel 158 mounted on the shaft 16. Thus as the banded cigars are successively lowered to the level of the discharge table they will be successively engaged by the ejector 150 and carried out on to the said table, and during this operation will be lightly pressed down by light tension springs 159.

Instead of employing the pointed scorer 119 hereinbefore described, for bending the ends of the bands, these ends may be curled or bent inward by drawing the bands tightly over a sharp surface, thus curling inward the ends of the bands opposite to the gummed ends, to facilitate the application of the bands to the cigars. To this end two bell-crank levers 160 and 161 are mounted on the shaft 73 and are operated respectively by cams 160$^a$ and 161$^a$ on the shaft 21, through studs 160$^d$ on the upper arms of said levers. The lever 160 carries an anvil curling blade 160$^b$ having a sharp edge at its inner end, and the lever 161 carries a co-operating lug 161$^b$. Levers 160 and 161 are held in contact with their cams by suitable springs 160$^c$.

The lug 161$^b$ is preferably enveloped by any soft friction material 161$^d$ wound around it. In the rotation of the carrier wheel 27 when a band has been brought into a position so that the ungummed end of a band has arrived at a position opposite the members 160$^b$ and 161$^b$, the said member 161$^b$ will be moved inward from the position shown in Fig. 21 to the position shown in Fig. 22, thus bending over the said ungummed end of said band against a stationary member 28 of a cigar holder, as shown in said Fig. 22. As said member 161$^b$ passes by the end of the band the latter will snap upward, as shown in Fig. 23. The member 161$^b$ now moves backward to the position shown in Fig. 24, in which position the end of the band is frictionally held between the members 160$^b$ and 161$^b$, and as the cigar to which the band is to be applied is placed in a pocket in the carrier-wheel, as indicated by Fig. 25, the end of the band is drawn over the sharp edge of the anvil curling member 160$^b$, and is curled as shown in said Fig. 25.

Instead of employing a back folder and sealer of the form hereinbefore described the form thereof shown in Fig. 20 may be used. In this form of the invention the back folder and sealing member 130 is carried by a lever 131$^b$. This lever is pivoted on a stud 140$^a$ and is connected by a link 131$^a$ to an arm of a bell-crank lever 143$^a$ fulcrumed on a shaft 113 and connected to a yoke 143$^b$ operated by a cam 146 fixed to shaft 19. In this form of the invention the front folder 124$^a$ is pivotally connected to an arm 125$^a$ having a pivotal connection with an arm 125ᵇ which is secured to a sector gear 162 on the shaft 140ᵃ meshing with another sector gear 163ᵃ on shaft 109.

The co-operating parts of this mechanism just described and the means for operating the same may be like those described in the form of back folder and sealer hereinbefore referred to.

Having thus described my invention I claim and desire to secure by Letters Patent:

1. In a cigar banding machine, the combination with cigar holding and band feeding mechanism, of means for bending the ungummed ends of the bands inward before they are applied to the cigars, said bending means comprising two moving members one of which has a friction surface and the other of which has a sharp edge over which the band is drawn while pressed against by said friction surface.

2. In a cigar banding machine, the combination with a rotary cigar carrier and means for feeding bands thereto, of a combined folder and heated sealer which is moved over the gummed ends of the bands to press them towards the cigars and which by a continued movement irons down the ends of the cigars, means for pressing said heated sealer against the bands and means for causing said sealer to dwell momentarily for the drying and sealing operation.

3. In a cigar banding machine, the combination with a rotary cigar carrier and means for feeding bands thereto, of a reciprocating member for folding in the ungummed ends of the bands, and a co-operating combined folder and heated sealer for folding in and ironing down the gummed ends of the bands.

4. In a cigar banding machine, the combination with a rotary cigar carrier and means for wrapping gummed bands about cigars, of a moistening device for the gummed bands, and a reciprocating heated sealer which is impressed against the bands when closed about the cigars, said sealer being mounted outside of but closely adjacent to the periphery of said carrier, and means for pressing said sealer against the folded-in gummed ends of the bands and for causing said sealer to dwell momentarily in its pressing, sealing position.

5. In a cigar banding machine, the combination with an intermittingly rotating carrier wheel provided with cigar holders, of intermittingly moving carrier belts for feeding in said cigars, two sets of vibrating arms pivoted below said carrier wheel, a rock shaft to which one set of said arms is attached and on which the other set of said arms is loosely mounted, so that one set may move independently of the other, means for operating said arms to cause them to be lifted together to place a cigar in a holder of said carrier wheel, and means for lowering one set of said arms while the other set remains in lifted position momentarily, said lifting arms having rearward extensions which serve as discharge arms to receive the banded cigars from the carrier wheel and lower them on to a receiving table.

6. In a cigar banding machine, the combination with an intermittingly rotating carrier wheel provided with cigar holders, of intermittingly moving carrier belts for feeding in said cigars, two sets of vibrating arms pivoted below said carrier wheel, a rock shaft to which one set of said arms is attached and on which the other set of said arms is loosely mounted, so that one set may move independently of the other, means for operating said arms to cause them to be lifted, together to place a cigar in a holder of said carrier wheel, and means for lowering one set of said arms while the other set remains in lifted position momentarily, said lifting arms having rearward extensions which serve as discharge arms to receive the banded cigars from the carrier wheel and lower them onto a receiving table, one set of lifting arms being provided with springs which yieldingly press on the cigars coming from the feeding belts, and one set of said rearward extension discharge arms having springs which yieldingly receive the banded cigars coming from said carrier wheel.

In testimony whereof I affix my signature.

THEODORE G. McGIRR.